Patented May 17, 1949

2,470,130

UNITED STATES PATENT OFFICE 2,470,130

CAUSTIC RESISTANT ETHERIFIED PHENOL-FORMALDEHYDE RESINS

Howard L. Bender and Alford G. Farnham, Bloomfield, N. J., assignors to Bakelite Corporation, a corporation of New Jersey No Drawing. Application February 7, 1945, Serial No. 576,702

6 Claims. (Cl. 260—14)

This invention relates to heat-hardenable phenol-aldehyde resins and their preparation.

Heat-hardening condensation products are prepared from phenol or its lower homologs (cresols and xylenols), polyhydroxy-benzenes (resorcinol or pyrogallol), and in general from phenolic derivatives having open two or more of the positions ortho and para to an hydroxyl by reacting with formaldehyde or other methylene-engendering reactant; they find a widespread use in coating and other compositions. While they are highly resistant to acids, water and common solvents, they are in marked contrast generally deficient in resistance to alkalies and alkaline solutions. The present invention is concerned primarily with improving caustic resistance while retaining heat-hardenability and other useful properties of the condensation products.

For caustic resistance, the resin art in the past has relied on hardening under alkaline conditions; phenolic resins so hardened in films of about 0.1 mil thickness, however, will not as a rule withstand a 10 per cent aqueous caustic soda solution for more than about 30 minutes at room temperature, and a boiling 5 per cent solution for only 10 minutes. It has been further proposed to use ring-substituted homologs, such as o-cresol and 2,4-xylenol, as the phenolic reactant for this purpose; these, however, result in resins of slow hardening and even non-hardening characteristics, and the resistance of the xylenol resin for instance in film form to a 10 per cent caustic solution at room temperature is of the order of only about 60 minutes and to a boiling 5 per cent caustic solution of about 30 minutes.

It has now been discovered that heat-reactive resins can be obtained that in film form are not appreciably affected over an indefinite period by 10 per cent caustic soda; for example films have been exposed to such a solution at 60° C. for 60 hours without measurable change. The accomplishment is brought about by a blocking to an extent of more than 50 per cent, and preferably to at least 90 per cent, of the arylhydroxy groups in a resin chain by etherification and the subsequent hardening of the etherified product in the presence of an acid catalyst or under acid conditions such that, when measured in an equal volume of water, the water extract is more acid than a pH of 7.0; a blocking of at least 90 per cent of the arylhydroxy groups is desirable for optimum caustic resistance. When the etherification is less than 50 per cent of the arylhydroxy groups, heat-hardening is possible under alkaline conditions, but the caustic resistance of the product is poor; and at a higher etherification of more than 50 per cent the resins do not heat-harden under alkaline conditions. Most unexpected, therefore, is that a higher etherified resin heat-hardens when an acid catalyst is used, and that a so-hardened derivative becomes caustic-resistant, though the initial condensation resin upon hardening without etherification may not be so characterized.

In addition, the acid-hardened ether resins in the form of films are inert to acids and solvents. They are for example insoluble in boiling acetone, and phenolic resins are generally tested for the completeness of the hardening reaction by the acetone-soluble content that can be extracted; likewise 15 per cent hydrochloric acid solution shows no effect. The resins are light in color and quite resistant to color changes under light and heat exposure.

A further distinguishing and useful property of acidified heat-hardening ether resins as hereindescribed are that they can be blended in about any proportion with urea-formaldehyde resins. In the past this has not been feasible, because (1) a phenolic resin hardening under alkaline conditions is opposed to a urea resin that hardens only in an acid or neutral state, and (2) a phenolic resin hardening under acid conditions is not caustic-resistant and thus upon admixture with a urea resin reduces the alkali resistance of the blend. The product of this invention, however, hardens on the acid side much like the urea resin and requires but slightly more acid than the urea resin; and, being superior to urea resin in both water and alkali resistance, the blend is thus an improvement over the straight urea resin.

The acidified ether resins are likewise useful as plasticizers for other types of resins including non-etherified phenolic resins, polymerized vinyl compounds, such as polystyrene, polyvinyl acetate, copolymers of vinyl chloride and acetate, etc. and cellulose esters. Additions up to 30 per cent or so to an acid-hardening etherified phenolic resin do not greatly decrease the hardening speed, where that property is involved, while they do materially improve caustic resistance. The ether resins have been blended with twice their weight of polyvinyl acetate and the blends gave clear films. The ether resins can be reacted with such hardening agents as furfural, and etherification is found to promote compatibility of phenolic resins with drying oils and the like.

Purposes of this invention are best served when the phenolic reactant for preparing the initial condensation product is phenol, meta-cresol or meta-xylenol, or phenolic mixture containing at least 40 per cent of one of these, and when at least 1.0, and preferably 1.2, and up to 2.0 mols of formaldehyde or equivalent are combined with the phenolic ingredient under alkaline conditions. With an etherification of more than 50 per cent of the arylhydroxy groups in a condensation product so prepared, the derivative is heat-hardenable in the presence of an acid catalyst at a speed that makes it useful for surface coatings and for adhesives in making laminates. The ortho- and para-substituted phenols when used alone are of slower reactivity with formaldehyde than phenol itself, and their condensation products upon etherification do not yield heat-hardening products; the meta-substituted phenols, as meta-cresol, meta-xylenol, resorcinol and monoresorcinol-ethers, are productive of heat-hardening resins which in turn can be etherified to give heat-reactive derivatives. With all these phenols, as with phenol itself, there is some loss of hardening speed of the etherified resin in comparison with the non-etherified resin at the same pH value (4.0 to 7.0 measured in a water extract).

Much depends on the alkaline catalyst used in the initial resin condensation. In general the oxides or hydroxides of the light metals, including the alkali metal and alkali earth metals, and similar compounds that lead to the combining of more than one mol of formaldehyde with each mol of the phenolic reactant are suitable with the exception of ammonia and the primary and secondary amines. Particularly useful catalysts are zinc, magnesium and aluminum oxides, for they promote the reaction of at least 1.2 mols formaldehyde with each mol of the phenol even in the presence of an excess of the phenol, and the condensation product is predominantly a 2,2'-diphenylol-methane that is characterized in the ether form by high speed of hardening or polymerization under slightly acid conditions (pH of 6.2); other useful catalysts are sodium and calcium hydroxides, though the etherified condensation products are of slower reactivity under slightly acid conditions. The ammonia and amine catalysts give condensation products that upon etherification do not acid-harden, and the cause may be the chemically-bound basic nitrogen present in the resin; in contrast, however, chemically-bound nitrogen present in urea or urea resin does not prevent the hardening of phenolic-ether resins when added to the urea resins, and moreover pyridine has been found useful as a condensing catalyst for producing the resins for etherification.

Mild acids for the phenol-formaldehyde condensation reaction are not precluded, provided the reaction mass is made alkaline later while some uncombined formaldehyde is still present. Thus an acid-condensed resin may be etherified with the aid of some sodium hydroxide and free formaldehyde present or added during the etherification step before the etherification is more than half completed.

The preferred resin ether derivatives are methyl, ethyl and benzyl ethers, and particularly such derivatives of condensation products having largely the 2,2'-diphenylol-methane structure. For the etherification (generally by reaction with the sodium salt of the resin) the following have been tried: diethyl-sulfate, dimethyl-sulfate, methyl-hydrogen-sulfate, benzyl-chloride, allyl-chloride, methallyl-chloride, p-nitrochloro-benzene, bromobenzene, chloroacetic acid, chloroacetone, chloromethyl-ether, ethylene-chlorohydrin, p-dichlorobenzene, trimethylene-bromide, dichloroethyl-ether, triglycol-dichloride, dichloroethyl-benzene. Of these only a few, such as the methyl- and ethyl-sulfates, benzyl-chloride and the unsaturated allyl-chloride, gave derivatives of satisfactory water and caustic resistance; the remaining aryl halides were not sufficiently active under the reaction conditions used; chloromethyl-ether and chloroacetone were too active and hydrolysis with water occurred instead of the production of phenol-resin-ethers; ethylene-chlorohydrin gave derivatives of low water resistance; p-toluene-sulfonyl-chloride gave an ester of the resin requiring more acid for hardening than an ether and an ester that hydrolyzed in hot caustic; chloroacetic acid gave carboxymethyl derivatives that apparently heat-hardened by ester formation with methylol groups and lacked alkali-resistance; some of the dihalides, notably trimethylene-bromide and triglycol-dichloride, gave ether cross-linking leading to infusible and insoluble products during the etherification that were difficult to handle in coating compositions but useful in fused resins for casting and the like. While, as stated, it was found most convenient to use the sodium salt of the resin, this was not essential in every case; for instance, benzyl-chloride reacted to release gaseous hydrogen-chloride and the caustic salt was not needed, but the handling of the resinous ether in the presence of gaseous hydrogen-chloride required careful control of temperature to avoid acid-hardening of the derivative.

The acids acting as hardening agents for the ether derivatives include sulfuric, phosphoric, benzene- and p-toluene sulfonic, ethyl sulfuric, oxalic, and oxalic-boric acids, the phosphoric acid being preferred; ethyl-sulfate, ethyl-benzene - sulfonate, p-toluene - sulfonate, sodium-ethyl-sulfate, and ammonium-ethyl-sulfate, are latent catalysts that become operative when heated to above 100° C. With the exception of oxalic, the organic acids failed as catalysts, and some of those tried were: acetic, benzoic, trichloroacetic, lactic, maleic and formic acids. The rate of hardening, as well as flexibility and adhesion of the hardened film, varied both with the kind and the amount of acid added; sulfuric acid appeared to be the strongest and most effective in low concentrations (0.01 per cent on the weight of resin), the sulfonic and substituted sulfuric acids next, followed by phosphoric and oxalic, oxalic-boric being stronger than oxalic alone; (boric acid alone gave an ester formation that was undesirable). As a rule enough acid is added to give a pH value of 5 or less and incorporated in the dried resin or in a solution; however, it can, like oxalic acid for example, be carried in a stream of hot air or other fluid and so passed over the surface of a deposited film or coating of the ether resin as, for instance, on the inside surface of a tube. The dependence of the rate of hardening of the derivatives on the amount of acid is illustrated by the following table, using varying percentages of phosphoric acid and testing for solubility in acetone:

| Baking time 135° C. | 1.5% | 2.5% | 3.0% |
|---|---|---|---|
| 15 min | sol | sol | sl. sol. |
| 30 min | sol | sl. sol. | insol. |
| 75 min | insol. | insol. | insol. |

The resin derivatives are found to be slowed as to reactivity and at times prevented from hardening by the presence of hydroxy compounds, such as water and alcohols; in this way the keeping time before use of solutions of the non-hardened derivatives can be increased by the addition of small amounts of alcohols. The keeping time is further affected by the hardening catalyst, being inversely proportional to the amount present. Since it is characteristic of the hardening reaction that it produces water, the derivatives form their own stabilizer in closed systems and so reach a hardening equilibrium generally on the soft gel side at 135° C.; when taken from a closed system the soft gel will then harden as the water escapes. Light gels can be brought back into solution as for instance by adding butyl alcohol.

From the standpoint of cost the choice lies between the methyl, ethyl and benzyl ethers; but the benzyl ethers, prepared from the reaction of benzyl chloride with the sodium salt of the initial condensation resin, appear the best for handling, for benzyl chloride enables the use of stable halogenated rings, such as ortho-chloro-benzyl-chloride, and the bound chlorine reduces fire hazards and increases bactericidal properties of the final products. For use as coatings several other factors are important, such as (1) the kind and amount of acid hardener, (2) the viscosity or degree of condensation of the ether derivatives, and (3) to a lesser extent the phenol-formaldehyde ratio and initial reaction catalyst. It is advantageous to use the minimum amount of acid that will harden a film in a reasonable time; in this respect a small amount of strong acid like sulfuric acid is better than larger quantities of weak acids, such as phosphoric or oxalic. It is desirable to increase the viscosity by advancing the degree of condensation in order to reduce a tendency to gather on baking and also to improve film strength and flexibility; this can be accomplished by heating under a vacuum at about 100° C. in the presence of a small amount of acid (0.1–0.2 per cent sulfuric acid) or by refluxing in a water-immiscible solvent, such as toluene, with a water separator almost to the point of gelling, and, if a soft gel does form, the derivatives can be brought back into solution by heating with butyl alcohol.

The invention is illustrated by the following examples.

*Example 1.*—A typical resin was made from 470.0 grams (5.0 mols) phenol,
600.0 grams (7.5 mols) Formalin (37.5%), and
4.7 grams magnesium oxide, by refluxing the mixture for 2 hours at 90° C., and after cooling the product was dissolved in 200 grams (5 mols) of sodium hydroxide in 1500 c. c. of water, giving the sodium salt of the condensation product having predominantly a 2,2'-diphenylol-methane structure. The solution was thereupon ethylated at 60°–80° C. with 848 grams (5.5 mols) of diethyl sulfate. After adding 25 more grams of sodium hydroxide, the mass was heated at 75°–85° C. for 1 hour and acidified with acetic acid; the separated resin was washed several times by decantation with hot water and again in butanol and vacuum distilled. The yield was about 500 grams of a very stable ethylated resin. To the resin was added 0.5 per cent of diethyl sulfate. A portion was dissolved in toluene and refluxed for 5 minutes at 12 inches vacuum, then heated at 100° C. until it gelled (about 25 minutes), butanol was added, and when heated the gel redissolved. Films of the ether resin, with the added diethyl sulfate, baked at 135° C. to acetone-insoluble in 15 minutes, and they showed good surface coverage and flexibility.

When dimethyl sulfate was substituted, a faster hardening ether resin was obtained, but otherwise similar to the ethylated resin.

*Example 2.*—A mixture of 188.0 grams (2 mols) phenol,
320.0 grams (4 mols) Formalin 37.5%), and
3.8 grams sodium hydroxide, was refluxed 2 hours at 85° C., cooled and dissolved in a solution of 77 grams sodium hydroxide in 400 c. c. of water. The alkaline solution was then treated at 85°–100° C. with 266 grams of benzyl chloride. After completing the addition, 8 grams of sodium hydroxide were added and the mass refluxed for one hour. The resin was separated and washed by recantation with hot water. The yield after vacuum dehydration to 140° C. was 438 grams. The benzylated resin, upon solution in butanol and addition of 2% of phosphoric acid, gave caustic-resistant films of good surface, flexibility and acetone-insolubility upon baking for 15 minutes at 135° C.

*Example 3.*—There were reacted 500 grams (5.3 mols) phenol,
212 grams (2.6 mols) Formalin (37.5%), and
5 grams magnesium hydroxide.

In this case there was free phenol at the end of the reaction in the mass, and, when the phenol was removed, about 1.2 mols of formaldehyde were found combined with a mol of phenol; the resin (about 366 grams) was heat-reactive and acetone-insoluble when hardened, but caustic-soluble both before and after hardening. The resin as a polysodium salt in water solution was ethylated by reacting with 720 grams of diethyl sulfate and it was then no longer heat-hardenable, either alone or with hexa or other alkaline agent added. Upon the addition, however, of 5 per cent of acid catalyst made from equal mols of boric and oxalic acids fused together, the derivative became heat-sensitive, and a hardened film of the derivative was insoluble in acetone though quite flexible.

*Example 4.*—A resin was made from 940.0 grams (10 mols) phenol,
1200.0 grams (15 mols) formaldehyde (37.5%),
9.4 grams magnesium oxide, by refluxing for 2 hours at 90° C. A portion was dehydrated to a resin and hardened to a cast resin in one hour at 135° C.; pieces, placed in 10% sodium hydroxide at 60° C. were darkened, increased in weight 2.5 per cent in 48 hours and in diameter about 0.9 per cent, and on drying the pieces cracked; an additional test to 96 hours showed scaling of the surface, and after two weeks disintegration occurred with a gain in weight of 9.5 per cent. Another portion was treated with diethyl-sulfate to form the ethyl ether, and the derivative was slightly acidified by phosphoric acid and baked into a block by heating for one hour at 135° C.; the block was not affected either as to surface condition or color and showed no change in weight on immersion in 10 per cent sodium hydroxide at 60° C. for 48 hours and 96 hours. Films were also made from the non-ethylated and the ethylated portions and tested in 10 per cent sodium hydroxide; the films of the non-ethylated resin turned red and disintegrated, while the films of the ethylated resin were not changed in color or otherwise affected at 60° C.

Example 5.—A reactive urea-formaldehyde resin was made from 60 grams (1.0 mol) urea,
120 grams (1.5 mol) formaldehyde (37.5%), and
1 gram ethylenediamine, by heating for 15 minutes under a reflux and dehydrating to a resin content of 90% solids; the yield was 105 grams. The product was heated to solution in 100 grams of butyl alcohol and acidified to a pH of 4 with oxalic acid. The solution was blended with a similar alcohol solution of the acidified ether resin of Example 1 in amounts to give blends containing 10 and 25 per cent of the ether resin based on the total resin content. The solutions were coated on a base and the films were heat-hardened by baking for 20 minutes at 135° C. The films were more water-resistant and alkali-resistant than films of the urea resin alone but less so than films of the ether resins of Example 1.

What is claimed is:

1. Process of treating a condensation product of from 1.2 to 2.0 mols of formaldehyde with a mol of a phenol reactant selected from the group consisting of phenol and methyl-substituted phenols, said phenol reactant containing at least 40 per cent of a phenol having open the positions on the ring that are ortho and para to the phenolic hydroxyl, in the presence of a catalyst selected from the group consisting of the oxides of zinc, magnesium and aluminum, which comprises etherifying under alkaline conditions above 50 per cent of the arylhydroxy groups present in the product by reacting the condensation product with one of the group consisting of methyl sulfate, ethyl sulfate, benzyl chloride and allyl chloride, and acidifying the etherified product with an acid selected from the group consisting of sulfuric, sulphonic, phosphoric and oxalic acids for imparting heat-harden ability to a caustic resistant condition.

2. Process of treating a condensation product of from 1.2 to 2.0 mols of formaldehyde with a mol of a phenol reactant selected from the group consisting of phenol and methyl-substituted phenols, said phenol reactant containing at least 40 per cent of a phenol having open the positions on the ring that are ortho and para to the phenolic hydroxyl, in the presence of a catalyst selected from the group consisting of the oxides of zinc, magnesium and aluminum, which comprises forming a salt of the product with the hydroxide of an alkali metal, etherifying above 50 per cent of the arylhydroxy groups present in the salt by reacting the salt with one of the group consisting of methyl sulfate, ethyl sulfate, benzyl chloride and allyl chloride, and acidifying the etherified product to a pH value between 4 and 7 with an acid selected from the group consisting of sulphuric, sulphonic, phosphoric and oxalic acids to render it heat-hardenable to a caustic resistant condition.

3. The acidified etherification product of a phenol-formaldehyde condensate prepared as described in claim 1.

4. Composition comprising a urea-formaldehyde resin plasticized with the acidified etherification product of a phenol-formaldehyde condensate prepared as described in claim 1.

5. Composition comprising a cellulose ester plasticized with an acidified etherification product of a phenol-formaldehyde condensate prepared as described in claim 1.

6. Composition comprising a polymerized vinyl compound plasticized with an acidified etherification product of a phenol-formaldehyde condensate prepared as described in claim 1.

HOWARD L. BENDER.
ALFORD G. FARNHAM.

REFERENCES CITED

The following references are of record in the file of this patent:

UNITED STATES PATENTS

| Number | Name | Date |
|---|---|---|
| 965,823 | Lebach | July 26, 1910 |
| 2,003,291 | Hill | June 4, 1935 |
| 2,267,842 | Schlack | Dec. 30, 1941 |
| 2,341,062 | Stager | Feb. 8, 1944 |
| 2,390,198 | Voss et al. | Dec. 4, 1945 |

FOREIGN PATENTS

| Number | Country | Date |
|---|---|---|
| 409,397 | Great Britain | May 3, 1934 |
| 511,511 | Great Britain | Aug. 21, 1939 |